(No Model.)
H. T. BRIGGS.
PULLEY.
No. 429,009. Patented May 27, 1890.
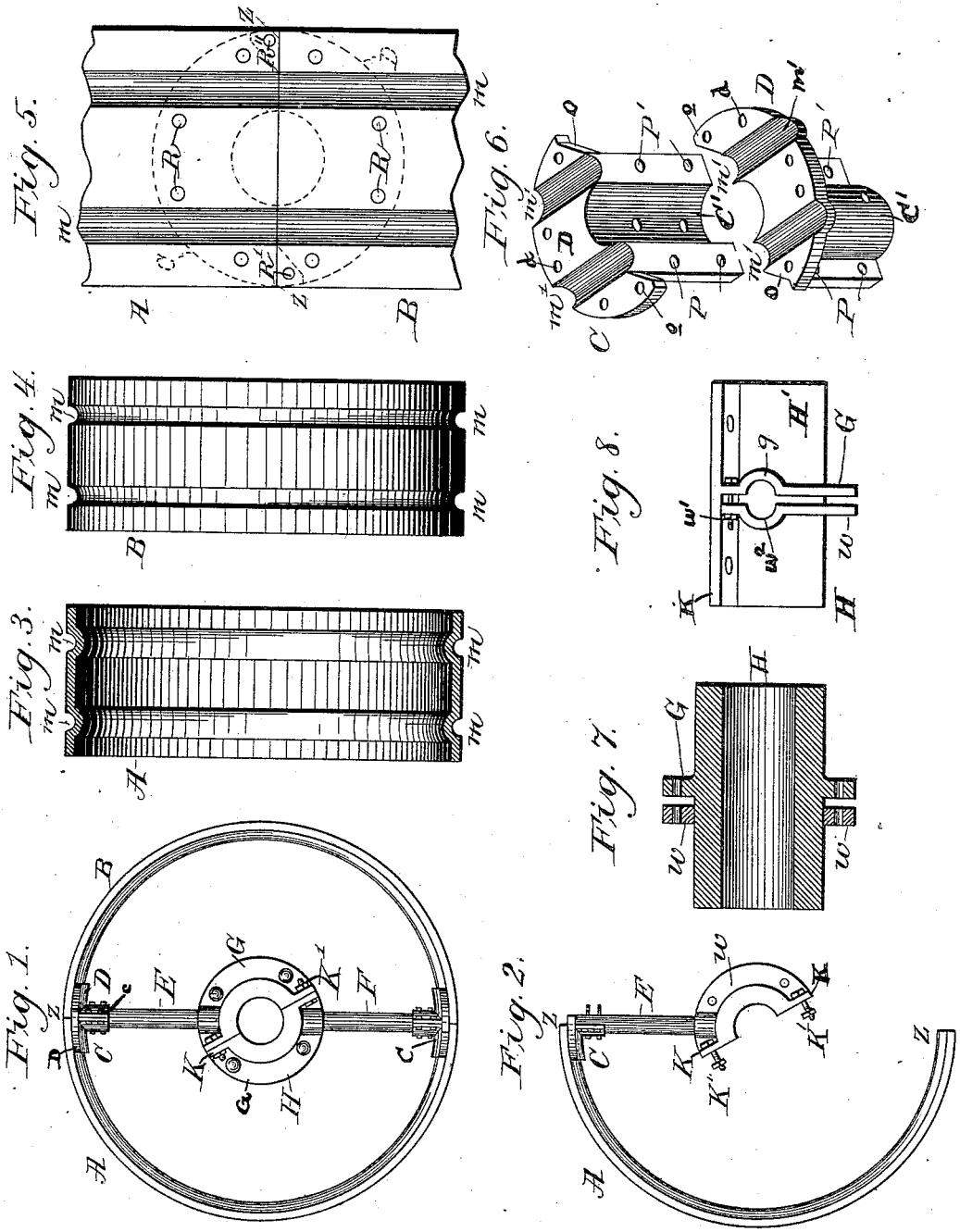
Witnesses:
J. DuShane
J. Anderson
Inventor:
Harrison T. Briggs

UNITED STATES PATENT OFFICE.

HARRISON T. BRIGGS, OF SOUTH BEND, INDIANA, ASSIGNOR OF ONE-HALF TO ALBERT MEYERS, OF SAME PLACE.

PULLEY.

SPECIFICATION forming part of Letters Patent No. 429,009, dated May 27, 1890.

Application filed November 20, 1889. Serial No. 331,032. (No model.)

*To all whom it may concern:*

Be it known that I, HARRISON T. BRIGGS, of South Bend, St. Joseph county, State of Indiana, have invented certain new and useful Improvements in Grooved Rimmed Pulleys; and I do hereby declare that the following is a full, clear, and exact description thereof, reference being had to the accompanying drawings, and to the letters of reference marked thereon, which form part of this specification, in which—

Figure 1 is a face view of my improved split pulley. Fig. 2 is a view of one-half thereof. Fig. 3 is a transverse sectional view of the rim. Fig. 4 is a face view of the rim. Fig. 5 is a face view, enlarged, of the rim, showing the joint. Fig. 6 is a perspective view, enlarged, of a spoke-socket for attaching a spoke to the rim. Fig. 7 is a longitudinal sectional view of the hub. Fig. 8 is a top view of one of the hub-sections.

This invention is an improvement in pulleys, and especially split pulleys; and its object is to provide a metallic grooved rim pulley that can be used for rope-power transmission and to improve the connections of the spokes and rim, and to simplify the pulley; and it consists in the novel construction and arrangement of parts hereinafter described and claimed.

Referring to the drawings by letter, H H designate the two opposite sections of the hub, consisting, essentially, of a semi-tubular part H', adapted to embrace the shaft and formed with a central radial semi-cylindrical flange G, and at the meeting edges of the sections with perforated flanges K, through which pass clamping-nuts K', that bind the halves together around the shaft, as indicated in Fig. 1. The flanges G are formed with a half socket or sink $g$, (only one being shown in each flange in the drawings,) and this socket is radial to the hub-axis, but at an angle to the parting line of the hub, so that a line drawn between the sockets $g$, while it intersects the axis of the hub, intersects the parting line thereof—*i. e.*, a line drawn through the plane of meeting edges of the sections, at an acute angle.

$w$ designate plates corresponding in contour to flanges G and slipped over the tubular portions of the hub and confined to flanges G by bolts $w'$, as indicated. These plates also have sinks $w^2$ opposite sinks $g$ in flanges G.

E F designate spokes, the inner ends of which are secured to the respective hub-sections by being seated in the sockets formed by sinks $g$ and $w^2$, and confined by means of bolts $w'$, which draw plates $w$ toward flanges G. Bolts may also be used for transfixing the flanges, plates, and ends of spokes, thus positively securing the spokes.

A B designate the similar opposite rim-sections. Each section is preferably made by rolling a metal plate of proper thickness and width into a semicircular form and with longitudinal grooves or channels $m\,m$, (see Figs. 3 and 4,) or such sections might be cast. The sections A and B, when placed opposite each other, form a complete circle and rim, and their meeting edges come directly opposite the edges of spokes E and F.

C designates spoke-fastening sockets for securing the rim-sections to the spokes. These socket-pieces are composed of two similar opposite halves having a semi-tubular portion C' embracing the ends of the spokes and secured thereto by means of bolts $c$, passing through perforations P P' in side flanges formed at the edges of portions C', as shown clearly in Fig. 6.

D D are semi-cylindrical flanges projecting from the outer ends of portions C' and at right angles to said portions, and these flanges are perforated, as at $d$, and are also formed with grooves $m'\,m'$, which receive the ribs or protuberances on the inner faces of the rim-sections formed in making grooves $m$. The socket-pieces and ends of spokes may be more securely united by bolts that transfix the socket halves and end of spoke. The ends of rim-sections A B are secured, respectively, to the flanges D of opposite halves of socket-pieces C, as shown in Fig. 5, being secured to the flanges D by bolts R. It will be observed by reference to Figs 5 and 6 that one end of flange D on each section is cut away or shouldered, as at O, and its other end has a projecting tongue $o$ corresponding to the cut-away portion, and when the socket halves are fitted together the tongue $o$ of one flange fits into the shoulder O of the opposite flange, (see Fig. 5,) so that said tongues project beyond the meeting line of rim-sections A B, which is indicated at Z Z, Fig. 5. These tongues are perforated, and the tongue of the flange D, bolted to rim A, projecting under rim B, is bolted thereto, as at R', and the tongue of the flange D, bolted to rim B, projects under and is bolted to rim A, as at R''. (See Fig. 5.) By this means lateral displacement of the meeting ends of the rim-sections is largely prevented independently of the uniting-bolts of the socket-sections and true joints effected in drawing the rim-sections together. It will be observed that the hub parts at an angle to the rim, thereby easing the uniting-bolts of the hub-sections of a great amount of strain, and it will also be observed that the ends of the rim-sections meet directly opposite the end of the spokes, so that binding or forcing of the ends of the rim-sections inward under any strain or pressure is absolutely prevented. This feature of uniting the rim-sections with the joints directly opposite a spoke I consider an important and valuable feature. Where more than two sections are used, the spokes should be arranged to radiate to each joint.

Having described my invention, what I claim as new, and desire to secure by Letters Patent thereon, is—

1. The combination of the hub composed of opposite semi-tubular portions formed with radial semi-cylindrical flanges G, having sinks $g$, the plates $w$, having sinks $w^2$, and the spokes, the uniting-bolts, and the rim-sections, all substantially as described.

2. The combination of the hub, spokes, and rim-sections with the separable socket-pieces C, having tubular portions C', perforated side flanges, and flanges D D, and the bolts uniting the portions of the socket-pieces, substantially as and for the purpose described.

3. The socket-pieces C, composed of similar halves, each half consisting of a tubular portion C', and a flange D, standing at right angles to part C and having a shoulder O and tongue $o$, substantially as described.

4. The herein-described pulley, consisting of the hub composed of sections H H, having flanges G, the plates $w$, the spokes E F, the grooved metallic rim-sections A and B, and the sectional socket-pieces C C, united to the spokes and to the rim-sections at the joints thereof, all substantially as and for the purpose described.

In testimony that I claim the foregoing as my own I affix my signature in presence of two witnesses.

HARRISON T. BRIGGS.

Witnesses:
JAMES DUSHANE,
WILL G. CRABILL.